(12) United States Patent
Li

(10) Patent No.: US 10,964,079 B2
(45) Date of Patent: Mar. 30, 2021

(54) METHOD AND APPARATUS FOR EDITING ROAD ELEMENT ON MAP, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Chengjun Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 9 days.

(21) Appl. No.: 16/410,709

(22) Filed: May 13, 2019

(65) Prior Publication Data

US 2019/0266772 A1  Aug. 29, 2019

Related U.S. Application Data

(63) Continuation of application No. PCT/CN2018/073689, filed on Jan. 23, 2018.

(30) Foreign Application Priority Data

Feb. 22, 2017  (CN) .......................... 201710097659.7

(51) Int. Cl.
  *G06T 11/60* (2006.01)
  *G06T 7/73* (2017.01)
  (Continued)

(52) U.S. Cl.
  CPC ............. *G06T 11/60* (2013.01); *G01C 21/32* (2013.01); *G06T 3/00* (2013.01); *G06T 3/40* (2013.01);
  (Continued)

(58) Field of Classification Search
  CPC ... G06T 11/60; G06T 7/75; G06T 3/00; G06T 3/40; G06T 3/4038; G06T 7/60;
  (Continued)

(56) References Cited

U.S. PATENT DOCUMENTS 5,917,436 A * 6/1999 Endo .................. G01C 21/3635
340/995.14
2006/0274147 A1* 12/2006 Chinomi ............... G06T 3/4038
348/118

(Continued)

FOREIGN PATENT DOCUMENTS

| CN | 102246159 A | 11/2011 |
|---|---|---|
| CN | 104535070 A | 4/2015 |
| CN | 106372255 A | 2/2017 |

OTHER PUBLICATIONS

The World Intellectual Property Organization (WIPO) International Search Report for PCT/CN2018/073689 dated Apr. 19, 2018 5 Pages (including translation).
Yong He, "GPS navigation Methods Research Based on High Precision Lane-level Map", China Master's Theses Full-text Database (Engineering Science & Technology II), Feb. 15, 2016 (Feb. 15, 2016), No. 02, ISSN: 1674-0246, sections 3.2, and 3.4-3.6 78 Pages.

*Primary Examiner* — Ke Xiao
*Assistant Examiner* — Kim Thanh T Tran
(74) *Attorney, Agent, or Firm* — Anova Law Group, PLLC

(57) ABSTRACT

A map-editing method is provided for an electronic device. The method includes obtaining a panorama image and a corresponding acquisition position; selecting an image region containing a road element from the panorama image; and projecting the selected image region to a top-view image containing the road element. The method also include obtaining an extracted road element that is automatically extracted and matching the acquisition position; comparatively displaying the extracted road element and the top-view image on a map according to the acquisition position;

(Continued)

and obtaining an editing instruction of the extracted road element displayed on the map, and responding to the editing instruction.

20 Claims, 9 Drawing Sheets

(51) Int. Cl.
*G01C 21/32* (2006.01)
*G06T 3/00* (2006.01)
*G06T 3/40* (2006.01)
*G06T 7/60* (2017.01)

(52) U.S. Cl.
CPC .............. *G06T 3/4038* (2013.01); *G06T 7/60* (2013.01); *G06T 7/75* (2017.01); *G06T 2207/20021* (2013.01); *G06T 2207/30256* (2013.01)

(58) Field of Classification Search
CPC . G06T 2207/20021; G06T 2207/30256; G06T 7/74; G06T 3/0037; G01C 21/32; G06F 16/29

USPC ........................................................ 345/629
See application file for complete search history.

(56) References Cited

U.S. PATENT DOCUMENTS

| | | | |
|---|---|---|---|
| 2009/0040186 A1* | 2/2009 | Esenther ............... | G06F 3/0488 345/173 |
| 2010/0045678 A1* | 2/2010 | Reid ....................... | G06T 13/00 345/427 |
| 2013/0169685 A1 | 7/2013 | Lynch | |
| 2013/0321568 A1* | 12/2013 | Suzuki ............... | H04N 5/23238 348/36 |
| 2014/0247352 A1* | 9/2014 | Rathi ................... | H04N 5/2258 348/148 |
| 2014/0300596 A1* | 10/2014 | Liu ........................ | G06T 5/006 345/419 |
| 2015/0098622 A1* | 4/2015 | Ryu .................... | G06K 9/00791 382/104 |
| 2015/0221118 A1* | 8/2015 | Shaburova .......... | G06K 9/00261 345/423 |
| 2016/0306901 A1* | 10/2016 | Ainsworth ............. | B29C 64/40 |
| 2016/0325682 A1* | 11/2016 | Gupta ................ | G06K 9/00798 |
| 2018/0253424 A1* | 9/2018 | Banerjee ............... | G06F 16/583 |

* cited by examiner

METHOD AND APPARATUS FOR EDITING ROAD ELEMENT ON MAP, ELECTRONIC DEVICE, AND STORAGE MEDIUM

RELATED APPLICATIONS

This application is a continuation application of PCT Patent Application No. PCT/CN2018/073689, filed on Jan. 23, 2018, which claims priority to Chinese Patent Application No. 2017100976597, entitled "METHOD AND APPARATUS FOR EDITING ROAD ELEMENT ON MAP" filed with the Chinese Patent Office on Feb. 22, 2017, the entire contents of all of which are incorporated herein by reference.

FIELD OF TECHNOLOGY

This application relates to the field of computer technologies and, in particular, to a method and apparatus for editing a road element on a map, an electronic device, and a storage medium.

BACKGROUND

High-precision maps have higher precision and richer elements than existing navigation maps and are used for assisted driving, semi-autonomous driving or autonomous driving.

Usually, a lane line on a high-precision map is extracted from a laser point cloud street view. A laser point cloud street view is a three-dimensional (3D) laser point cloud street view generated by acquiring, by using a laser point cloud technology, 3D information about a road and surrounding buildings through laser scanning during street view acquisition, and processing the information through processing operation. However, when a road element (for example, a lane line) is extracted from the laser point cloud street view, usually, because of factors such as blocking or unclear index line, the extracted road element can be incorrect (for example, there are excessively many lane lines, or a lane line is missed or is erroneous). In this case, the extracted road element needs to be edited to generate a high-precision map.

In a conventional method, a point needs to be manually selected and drawn on the laser point cloud street view, to edit a road element. However, because the laser point cloud street view is a 3D space and a computer screen is a two-dimensional (2D) plane, it is time-consuming to select a point in the 3D space on the 2D computer screen. Therefore, the conventional method of selecting and drawing a point on a 3D laser point cloud street view to edit a road element is low in efficiency.

SUMMARY

According to various embodiments provided in the present disclosure, a method and apparatus for editing a road element on a map, an electronic device, and a storage medium are provided.

In one aspect of the present disclosure, a map-editing method is provided for an electronic device. The method includes obtaining a panorama image and a corresponding acquisition position; selecting an image region containing a road element from the panorama image; and projecting the selected image region to a top-view image containing the road element. The method also include obtaining an extracted road element that is automatically extracted and matching the acquisition position; comparatively displaying the extracted road element and the top-view image on a map according to the acquisition position; and obtaining an editing instruction of the extracted road element displayed on the map, and responding to the editing instruction.

In another aspect of the present disclosure, an electronic device for map-editing is provided. The electronic device includes a memory storing computer program instructions; and a processor coupled to the memory. When executing the computer program instructions, the processor is configured to perform: obtaining a panorama image and a corresponding acquisition position; selecting an image region containing a road element from the panorama image; projecting the selected image region to a top-view image containing the road element; obtaining an extracted road element that is automatically extracted and matching the acquisition position; comparatively displaying the extracted road element and the top-view image on a map according to the acquisition position; and obtaining an editing instruction of the extracted road element displayed on the map, and responding to the editing instruction.

In another aspect of the present disclosure, a non-transitory computer-readable storage medium is provided. The non-transitory computer-readable storage medium stores computer program instructions executable by at least one processor to perform: obtaining a panorama image and a corresponding acquisition position; selecting an image region containing a road element from the panorama image; projecting the selected image region to a top-view image containing the road element; obtaining an extracted road element that is automatically extracted and matching the acquisition position; comparatively displaying the extracted road element and the top-view image on a map according to the acquisition position; and obtaining an editing instruction of the extracted road element displayed on the map, and responding to the editing instruction.

The details of one or more embodiments of the present disclosure are disclosed in the following accompanying drawings and description. Other features, objectives, and advantages of this application become clearer from the specification, the accompanying drawings, and the claims.

BRIEF DESCRIPTION OF THE DRAWINGS

To describe the technical solutions in the embodiments of this application more clearly, the following briefly describes the accompanying drawings. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, the technical solutions, and the advantages of the present disclosure clearer, the following further describes the present disclosure in detail with reference to the accompanying drawings. It should be understood that the specific embodiments described herein are only used to describe the present disclosure, instead of limiting the present disclosure.

Figure 1:
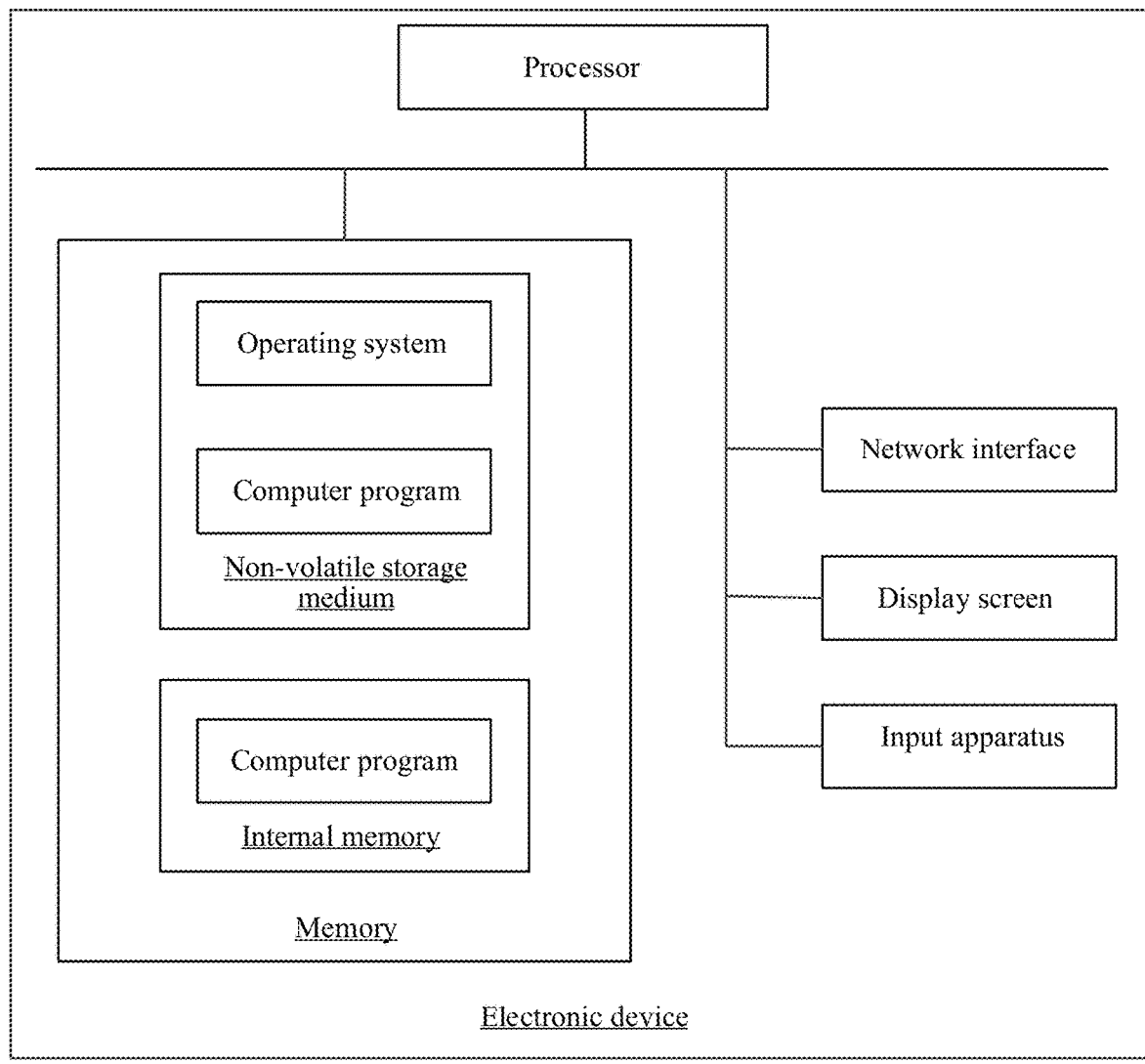
FIG. 1 is a schematic diagram of an inner structure of an electronic device according to an embodiment of the present disclosure.

As shown in FIG. 1, in an embodiment, an electronic device is provided. The electronic device includes a processor, a memory, a network interface, a display screen, and an input apparatus that are connected by using a system bus. The memory includes a non-volatile storage medium and an internal memory. The non-volatile storage medium of the electronic device may store an operating system and computer readable instructions. The computer readable instructions, when executed, may cause the processor to perform a method for editing a road element on a map. The processor is configured to provide computing and control capabilities, to support running of the entire electronic device. The internal memory may store computer executable instructions. The computer executable instructions, when executed by the processor, may cause the processor to implement a method for editing a road element on a map. The network interface is configured to connect to a network for communication, for example, for obtaining a panorama image and a corresponding acquisition position from a database of a server by using the network, and the like. The display screen of the electronic device may be a liquid crystal display screen, an e-ink display screen, or the like. The display screen may be configured to output various interfaces, for example, comparatively display an extracted road element and a top-view image on a map. The input apparatus may be a touch layer covering the display screen, or may be a button, a trackball, or a touchpad disposed on a housing of the electronic device, or may be an external keyboard, touchpad, a mouse, or the like, and is configured to receive various control instructions that are input, for example, an editing instruction of an extracted road element displayed on a map. The electronic device may be a personal computer, a mobile terminal, an in-vehicle device, or a wearable device. The mobile terminal is a mobile phone, a tablet computer, or a personal digital assistant.

A person skilled in the art may understand that in the structure shown in FIG. 1, only a block diagram of a partial structure related to a solution in the present disclosure is shown, and FIG. 1 does not constitute a limitation to the electronic device to which the solution in the present disclosure is applied. Specifically, the electronic device may include more components or fewer components than those shown in FIG. 1, or some components may be combined, or a different component deployment may be used.

Figure 2:
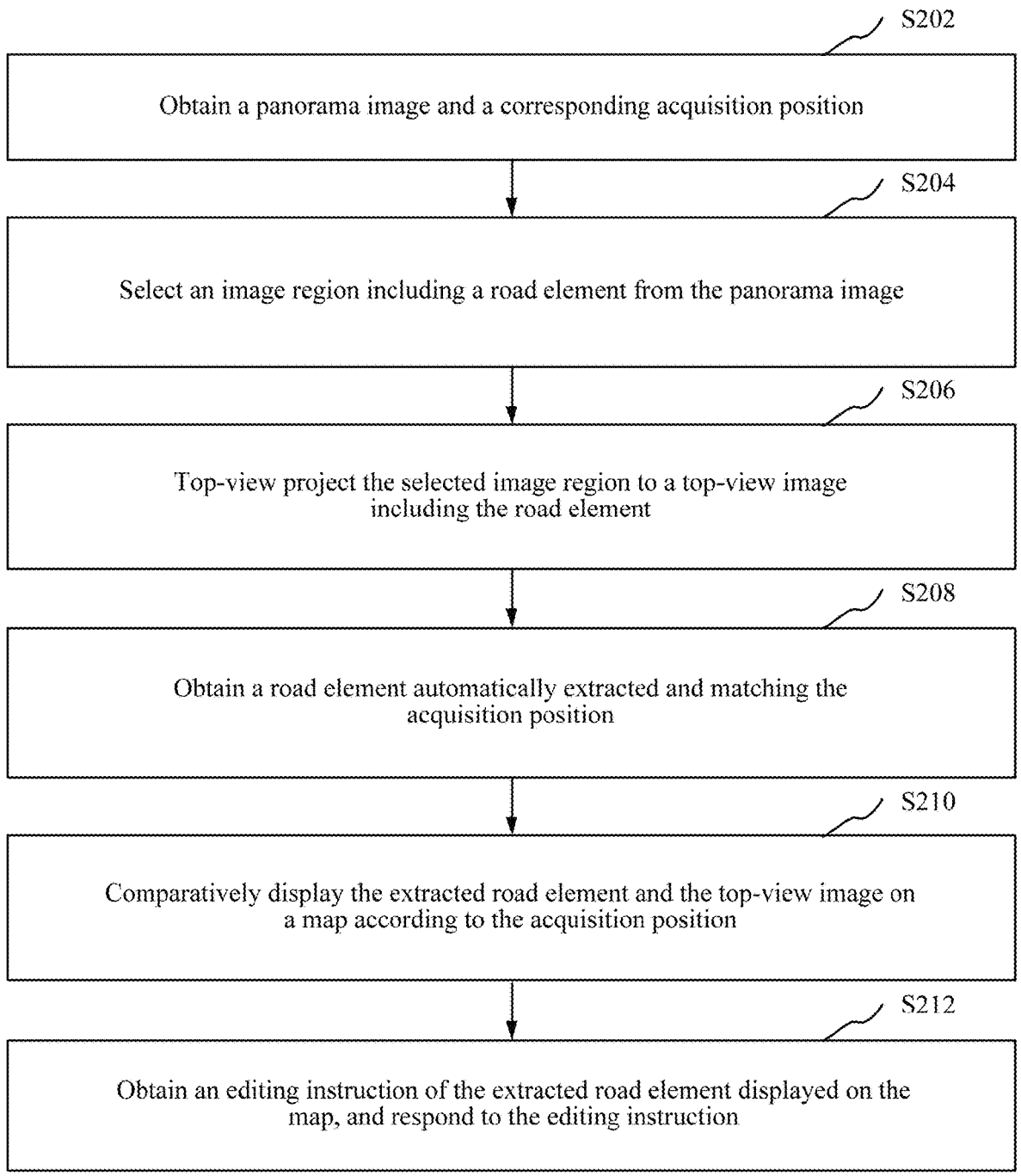
FIG. 2 is a schematic flowchart of a method for editing a road element on a map according to an embodiment of the present disclosure.

As shown in FIG. 2, in an embodiment, a method for editing a road element on a map is provided. The method is described by using an example in which the method is applied to the electronic device in FIG. 1. The method specifically includes the followings.

S202: Obtaining a panorama image and a corresponding acquisition position.

The panorama image is an image obtained by stitching a plurality of images photographed in different directions in a horizontal plane. The stitching herein is performed according to content continuity of the plurality of images, so that the panorama image obtained through stitching is continuous in content. The panorama image may be a 360° panorama image. In this case, the panorama image is a scene observed through horizontal rotation by 360° from an observation point, and left and right edges of the panorama image may be seamlessly connected. The panorama image includes a road element.

The electronic device may obtain a panorama image that is obtained in advance through stitching, or may obtain images photographed in a plurality of directions and combine the images into one panorama image in real time. The panorama image that is obtained in advance through stitching may be obtained locally or by using a network, and the plurality of images to be stitched to form the panorama image may be obtained locally or by using a network, or be photographed in real time.

The acquisition position corresponding to the panorama image is a geographical position used for acquiring the plurality of images to be stitched to form the panorama image, and may be specifically a geographical position of an image acquisition device acquiring the plurality of images. The acquisition position may be represented as a longitude and a latitude used for acquiring the plurality of images to be stitched to form the panorama image. The image acquisition device may be a device the same as or different from the foregoing electronic device.

The electronic device may obtain, locally or by using a network, the acquisition position corresponding to the panorama image that is obtained in advance through stitching.

S204: Selecting an image region including a road element from the panorama image.

The road element is an information element capable of reflecting a road feature. The road feature may include a form feature of the road, and road traffic markings on the road (that is, on a surface of the road).

The form feature of the road includes one or a combination of information such as the contour, width, and direction of the road.

The road traffic marking is a marking on the surface of the road used for conveying traffic information such as guidance, restriction, and warning to a road traveler by using lines, arrows, characters, object markings, raised pavement markers, delineators, and the like. The road traffic marking includes lane information and image and character markings on the ground such as arrows and characters on the ground surface. The lane information includes one or a combination of number of lanes, lane width, lane line shape, lane line attribute information, and the like. The lane line attribute information includes whether a lane line is a solid line or a dashed line, a color of the lane line, a width of the lane line, and the like.

The electronic device may select the image region including the road element from the complete panorama image, or may divide the panorama image into image tiles, and select an image tile including the road element from the divided image tiles, to obtain the image region including the road element.

In an embodiment, the electronic device may select the image region including the road element from the panorama image according to priori knowledge about a position of the road element in the panorama image. For example, when a 3D model of the panorama image is spherical, the road element is usually located in a lower half part of the entire panorama image in the width direction. In an embodiment, the electronic device may select the image region including the road element from the panorama image in a pattern recognition manner.

S206: Projecting the selected image region to a top-view image containing the road element.

The top-view projection means that a line of sight from a top-view observation point to a point in the image region extends to a top-view projection plane to form a projection point, and the projection points form a top-view image. Specifically, the electronic device may set an observation point that is in a direction perpendicular to the top-view projection plane and whose position is higher than a position of the selected image region in the 3D model of the panorama image, look at the position of the selected image region in the 3D model of the panorama image from the observation point, to project the selected image region to the top-view projection plane to form a projection point, and use the projection points in the top-view projection plane to form a top-view image parallel to the top-view projection plane. When using the projection points to form the top-view image, the electronic device may extend the projection points to image blocks, and enable neighboring image blocks to be stitched, to form the top-view image.

In an embodiment, the top-view observation point is located in a central axis that is of the 3D model of the panorama image and that is perpendicular to the top-view projection plane. In an embodiment, the top-view observation point is the same as an observation point of the 3D model of the panorama image.

Figure 3:
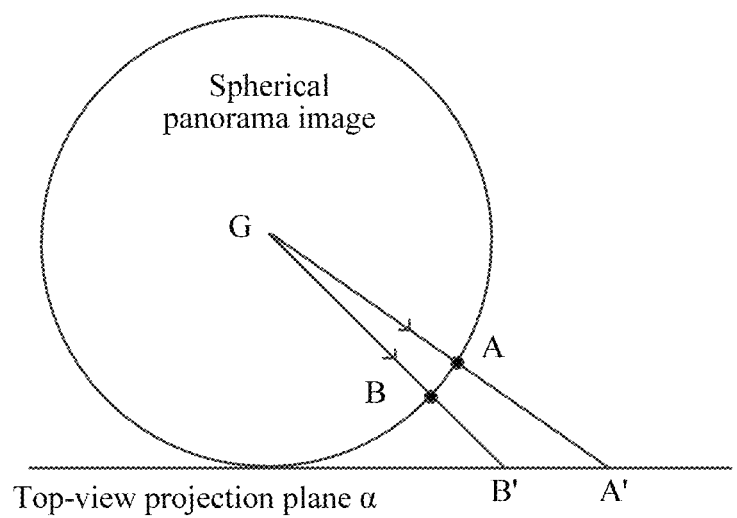
FIG. 3 is a schematic diagram of top-view projection according to an embodiment of the present disclosure.

For ease of understanding, refer to FIG. 3, the top-view projection is described by using an example. As shown in FIG. 3, the observation point of the spherical 3D model of the panorama image is G, and G is used as the top-view observation point for top-view projecting a point A and a point B of the spherical panorama image. The point A and the point B are looked at from the observation point G, to project the point A and the point B in the panorama image to a top-view projection plane α, to obtain A' and B'. Such a projection manner is top-view projection. By analogy, each point in the selected image region in the panorama image is top-view projected, so that a planar top-view image is obtained in the top-view projection plane.

In an embodiment, after the selected image region is projected in the top-view projection plane, an image region covering all road elements may be captured from the top-view projection plane to be used as a top-view image.

Figure 4:
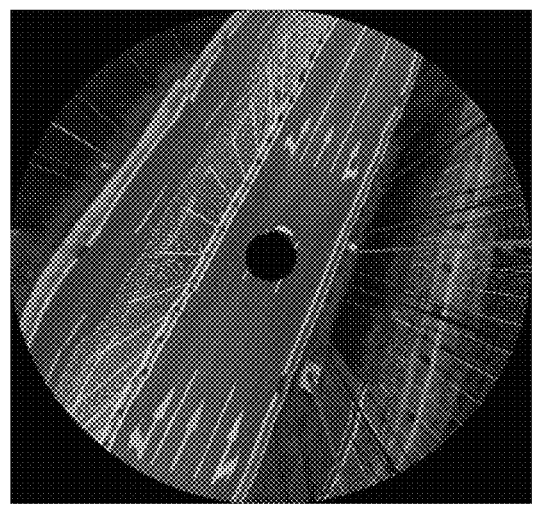
FIG. 4 is a schematic diagram of a top-view image according to an embodiment of the present disclosure.

FIG. 4 shows a top-view image including a road element according to an embodiment. A circular region in the top-view image in FIG. 4 is the image region including the road element and obtained through top-view projection.

S208: Obtaining a road element automatically extracted and matching the acquisition position.

The road element matching the acquisition position is a road element included in a road at the acquisition position. The automatically extracted road element is a road element extracted by using a computer technology. The electronic device may automatically extract a road element from a third-party road image, or may automatically extract a road element from a laser point cloud, or may automatically extract a road element from the top-view image generated in S206. The electronic device may obtain, locally or by using a network, a road element automatically extracted from a preset image or a laser point cloud in advance and matching the acquisition position.

The obtained road element automatically extracted and matching the acquisition position may be a road element having a size matching or not matching a size of a map. This is not limited herein.

S210: Comparatively displaying the extracted road element and the top-view image on a map according to the acquisition position.

Specifically, the map is displayed on a display interface of the electronic device. The electronic device may determine, according to the acquisition position, a position corresponding to the extracted road element and a position corresponding to the generated top-view image on the map, and then comparatively display the top-view image and the extracted road element on the map according to the determined corresponding positions on the map. The process of comparatively displaying the extracted road element and the top-view image on the map is comparatively displaying, on the map, the extracted road element and a road element at a same position in the top-view image.

Further, the extracted road element and the top-view image may be comparatively displayed in different regions on an editing interface. For example, the extracted road element may be displayed on a corresponding road on the map, and the top-view image may be displayed in a comparison region on the editing interface, thereby comparatively displaying the extracted road element displayed on the road on the map and a road element at a same position in the top-view image in the comparison region. Alternatively, the extracted road element and the road element in the top-view image may be displayed in a superimposed way in a same region. Still further, when displayed in a superimposed way, the top-view image may be translucently displayed.

In an embodiment, S210 includes: adjusting a size of the extracted road element and a size of the top-view image to sizes matching a size of the map, and comparatively displaying, according to the acquisition position, the extracted road element and the top-view image after the size adjustment on the map.

S212: Obtaining an editing instruction of the extracted road element displayed on the map, and respond to the editing instruction.

For editing a road element on a map, the extracted road element displayed on the map may be edited with reference to the generated top-view image including the road element. The electronic device correspondingly obtains an editing instruction of the extracted road element displayed on the map and correspondingly edits the extracted road element in response to the road element editing instruction. The editing instruction includes one or a combination of instructions such as road element increase, deletion, movement, and modification.

Figure 5:
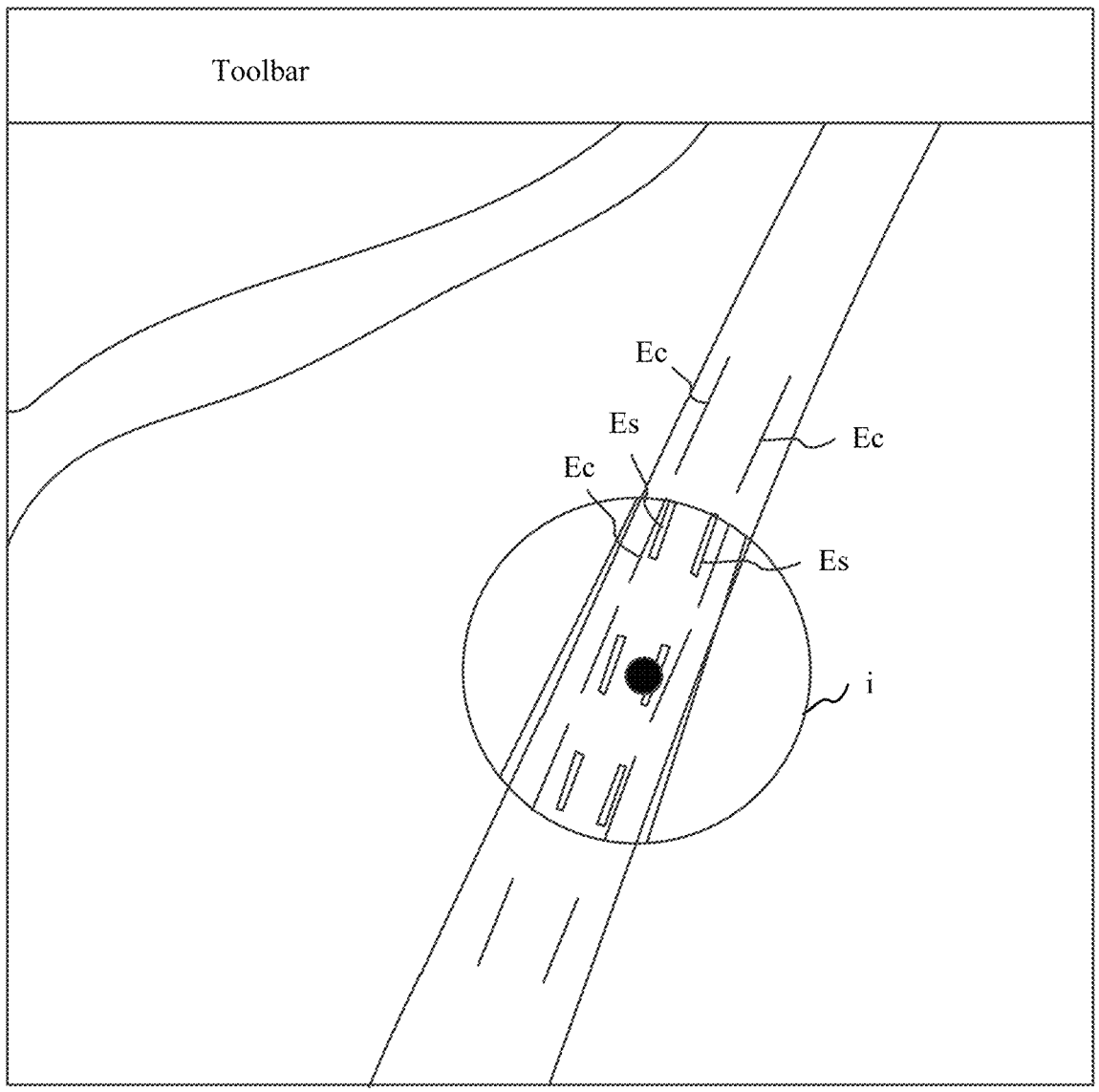
FIG. 5 is a schematic diagram of an interface for editing a road element on a map according to an embodiment of the present disclosure.

FIG. 5 shows an interface for editing a road element on a map according to an embodiment. Ec is the extracted road element (refer to short-line markings at intervals in FIG. 5), i is the generated top-view image, Es is road element information in the top-view image (refer to long-strip-shaped markings at intervals in FIG. 5), and the extracted road element Ec may be edited with reference to the road element information Es in the top-view image i.

In the method for editing a road element on a map, the image region including the road element is selected from the panorama image, and the selected image region is top-view projected to the top-view image containing the road element. In this way, the 3D panorama image can be projected to a planar top-view image, and through top-view projection, the road element information presented in the planar top-view image that is obtained through projection can be ensured to be accurate. In addition, the road element automatically extracted and matching the acquisition position is obtained, and the extracted road element and the top-view image are comparatively displayed on the map according to the acquisition position. In this way, the planar top-view image presenting the accurate road element information can be used as a reference to correspondingly edit the extracted road element. Compared with manually editing a road element with reference to a laser point cloud street view in a 3D space, this significantly improves the efficiency of editing a road element.

In an embodiment, S204 includes: dividing the panorama image into image tiles along a line-of-sight horizontal angle axis and a line-of-sight vertical angle axis in a line-of-sight angle coordinate system of the panorama image; and selecting an image tile including the road element from the divided image tiles. S206 includes: top-view projecting the selected image tiles to a top-view projection plane, to form the top-view image.

The line-of-sight angle coordinate system is a 2D coordinate system established in the panorama image. A line of sight is a ray formed by viewing from the observation point to a position of a point in the panorama image in the 3D model of the panorama image. The line-of-sight angle coordinate system includes a line-of-sight horizontal angle axis and a line-of-sight vertical angle axis. A position of a point in the panorama image in the panorama image may be represented by a line-of-sight horizontal angle on the line-of-sight horizontal angle axis and a line-of-sight vertical angle on the line-of-sight vertical angle axis of a line of sight looking at the position.

The line-of-sight vertical angle is a magnitude of the angle between the line of sight corresponding to the point in the panorama image and the direction that is perpendicular to and pointing to the top-view projection plane. A line-of-sight horizontal angle reference plane needs to be introduced first before the line-of-sight horizontal angle is defined.

The line-of-sight horizontal angle reference plane is a reference plane used for defining a line-of-sight horizontal angle corresponding to a point in the panorama image. In an embodiment, the line-of-sight horizontal angle reference plane is a plane passing a center of the 3D model of the panorama image and parallel to the top-view projection plane. An initial reference direction is preset in the line-of-sight horizontal angle reference plane.

The line-of-sight horizontal angle is an angle between a corresponding sub-direction of the line of sight corresponding to the point in the panorama image in the line-of-sight horizontal angle reference plane and the initial reference direction in the line-of-sight horizontal angle reference plane. The corresponding sub-direction of the line of sight corresponding to the point in the panorama image in the line-of-sight horizontal angle reference plane is a direction that is consistent with a direction of the line of sight and that is formed by an intersecting line between the line-of-sight horizontal angle reference plane and a plane that is perpendicular to top-view projection plane and in which the line of sight corresponding to the point in the panorama image is located.

Figure 6:
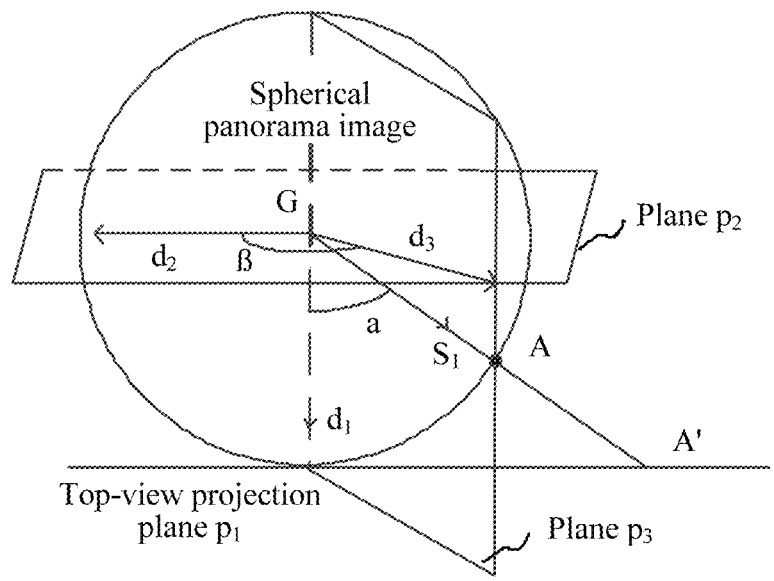
FIG. 6 is a schematic diagram of a line-of-sight vertical angle and a line-of-sight horizontal angle according to an embodiment of the present disclosure.

The line-of-sight vertical angle and the line-of-sight horizontal angle are described as an example with reference to FIG. 6. As shown in FIG. 6, the top-view projection plane is $p_1$, and the A point in the panorama image is projected to the projection point A' in the top-view projection plane. In this case, a line-of-sight vertical angle corresponding to the A point is an angle $\alpha$ between a line of sight $S_1$ and a direction $d_1$ that is perpendicular to and pointing to the plane $p_1$. A plane $p_2$ is the line-of-sight horizontal angle reference plane, a plane $p_3$ is a plane passing the A point and perpendicular to the top-view projection plane $p_1$, and a direction formed by an intersecting line between the plane $p_2$ and the plane $p_3$ and that is consistent with a direction of the line of sight $S_1$ is $d_3$. In this case, a line-of-sight horizontal angle corresponding to the A point is an angle $\beta$ between the direction $d_3$ and an initial reference direction $d_2$ in the plane $p_2$.

In an embodiment, in the line-of-sight angle coordinate system of the panorama image, the line-of-sight horizontal angle ranges from 0° to 360°, and the line-of-sight vertical angle ranges from 0° to 180°.

The electronic device divides the panorama image into image tiles along the line-of-sight horizontal angle axis and the line-of-sight vertical angle axis in the line-of-sight angle coordinate system of the panorama image. The electronic device may randomly divide the panorama image along the line-of-sight horizontal angle axis and line-of-sight vertical angle axis, and sizes of the image tiles may be different. Alternatively, the electronic device may divide the panorama image along the line-of-sight horizontal angle axis and the line-of-sight vertical angle axis according to preset division quantities of M and N, to be specific, divide the panorama image into M pieces on the line-of-sight horizontal angle axis and N pieces on the line-of-sight vertical angle axis, to divided the panorama image into M×N pieces of image tiles. A value of M×N may be set according to an actual requirement, and this is not specifically limited. In an embodiment, the value of M×N may be 8×4 or 16×8.

An image tile including the road element is selected from the divided image tiles. It may be that all image tiles including the road element are selected, or image content of an image tile including the road element is further analyzed, and an image tile in which the road element is significantly blocked by a panorama image acquisition device or a carrier device (for example, a vehicle carrying an acquisition device) in which the panorama image acquisition device is located is deleted from the image tiles including the road element, to obtain a final selected image tile including the road element.

Figure 7:
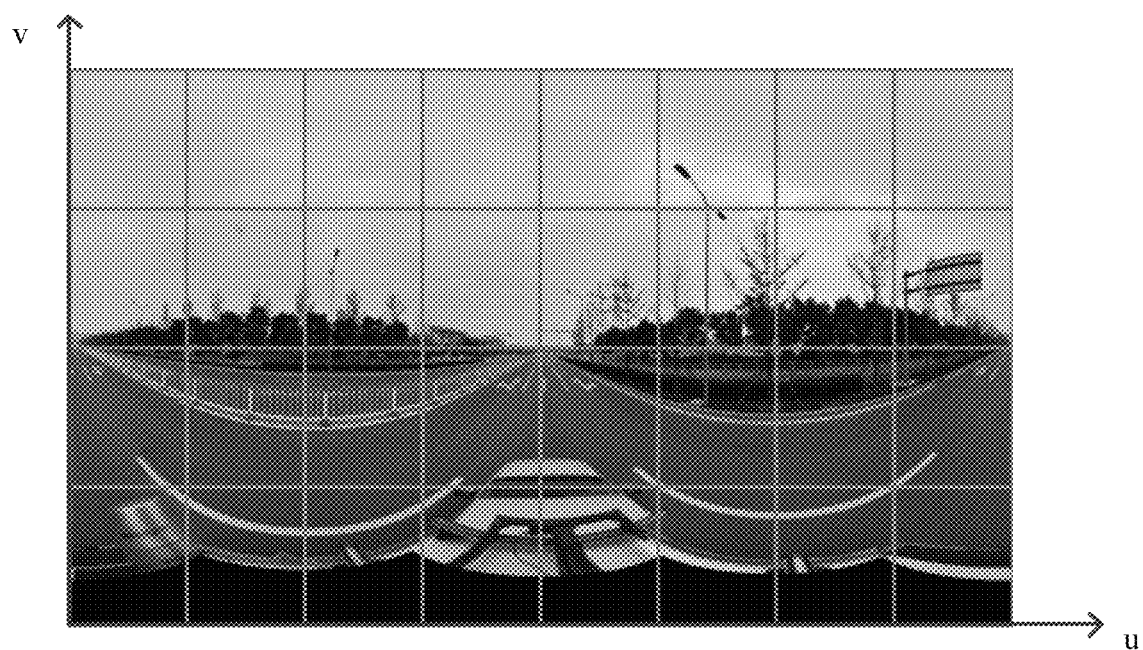
FIG. 7 is a schematic diagram of dividing a panorama image into tiles based on a line-of-sight angle coordinate system of the panorama image according to an embodiment of the present disclosure.

S204 is described by using an example. FIG. 7 shows a line-of-sight angle coordinate system of a panorama image. A u axis is a line-of-sight horizontal angle axis, and a v axis is a line-of-sight vertical angle axis. Assuming that the panorama image is divided into eight pieces on the line-of-sight horizontal angle axis and four pieces on the line-of-sight vertical angle axis, the panorama image is finally divided into 8×4 pieces of image tiles. An image tile including the road element is selected from the divided 8×4 pieces of image tiles. The 16 pieces of image tiles including the road element that are located in a lower half part of the panorama image in FIG. 7 may be selected. Alternatively, eight pieces of image tiles that are located in the lowermost ¼ part may be deleted from the 16 pieces of image tiles because the road elements in the eight pieces of image tiles that are located in the lowermost ¼ part are significantly blocked by a vehicle, and eight pieces of image tiles including the road element that are located from the lower ½ part to the lower ¼ part are selected.

In one embodiment, an image tile is used as a unit to be top-view projected. Compared with top-view projecting an entire image region containing the road element, because the image tile is relatively small, projection processing is relatively fast, avoiding slow processing caused by projection of an excessively large image region. In this way, the speed of top-view projection is increased, and further, the speed of generating a top-view image is increased. If there are a plurality of selected image tiles, the selected image tiles may be top-view projected by using a plurality of threads. Compared with top-view projecting an entire image region including the road element, this can also increase the speed of top-view projection, and further increase the speed of generating a top-view image.

Figure 8:
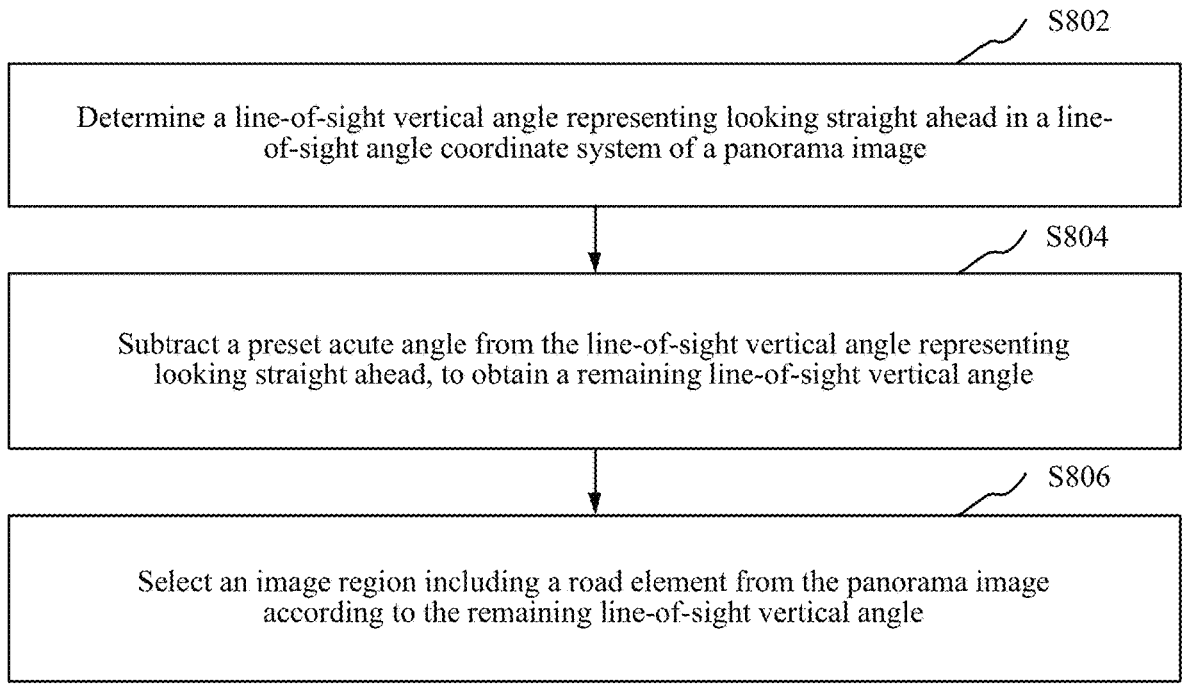
FIG. 8 is a schematic flowchart of selecting an image region including a road element from a panorama image according to an embodiment of the present disclosure.

FIG. 8 is a schematic flowchart of S204 of selecting an image region including a road element from a panorama image according to an embodiment. As shown in FIG. 8, S204 specifically includes the followings.

S802: Determining a line-of-sight vertical angle representing looking straight ahead in a line-of-sight angle coordinate system of the panorama image.

In the line-of-sight angle coordinate system of the panorama image, the line-of-sight vertical angle is a magnitude of the angle between the line of sight corresponding to the point in the panorama image and the direction that is perpendicular to and pointing to the top-view projection plane, and the angle between the line of sight representing looking straight ahead and the direction that is perpendicular to and pointing to the top-view projection plane is approximately 90°. Therefore, the line-of-sight vertical angle representing looking straight ahead is approximately 90°.

S804: Subtracting a preset acute angle from the line-of-sight vertical angle representing looking straight ahead, to obtain a remaining line-of-sight vertical angle.

A magnitude of the preset acute angle (denoted as "θ") may be set according to an actual requirement.

The remaining line-of-sight vertical angle is equal to the line-of-sight vertical angle representing looking straight ahead minus the preset acute angle, in other words, is equal to 90°−θ.

S806: Selecting the image region containing the road element from the panorama image according to the remaining line-of-sight vertical angle.

Specifically, the remaining line-of-sight vertical angle is used as an upper limit to determine a range of the line-of-sight vertical angle, to determine an image region corresponding to the range of the line-of-sight vertical angle from the panorama image. The image region includes the road element. A lower limit of the range of the line-of-sight vertical angle may be a line-of-sight vertical angle representing a right top view, or may be a line-of-sight vertical angle representing an oblique top view and less than the remaining line-of-sight vertical angle.

For example, the lower limit of the range of the line-of-sight vertical angle is the line-of-sight vertical angle representing a right top view, and an angle between a line of sight of the right top view and the direction that is perpendicular to and pointing to the top-view projection plane is 0°. In this case, the lower limit of the range of the line-of-sight vertical angle is 0°, and the line-of-sight vertical angle ranges from 0° to (90°−θ). An image region corresponding to the line-of-sight vertical angle ranging from 0° to (90°−θ) is selected from the panorama image. The image region includes the road element.

For another example, the lower limit of the range of the line-of-sight vertical angle is 45°. The line-of-sight vertical angle 45° means that an angle between a line of sight and the direction that is perpendicular to and pointing to the top-view projection plane is 45°, and represents an oblique top view, where 45°<(90°−θ). Therefore, the line-of-sight vertical angle ranges from 45° to (90°−θ). In this case, an image region corresponding to the line-of-sight vertical angle ranging from 45° to (90°−θ) is selected from the panorama image. The image region includes the road element.

In an embodiment, when the panorama image is divided into image tiles along the line-of-sight horizontal angle axis and the line-of-sight vertical angle axis in the line-of-sight angle coordinate system of the panorama image and an image tile including the road element includes an image region corresponding to the line-of-sight vertical angle representing looking straight ahead, S406 includes: cutting, according to the remaining line-of-sight vertical angle, the image tile in which the image region corresponding to the line-of-sight vertical angle representing looking straight ahead is located, and together selecting a cut image tile and an image tile that is not cut and that includes the road element as image tiles including the road element.

Specifically, the remaining line-of-sight vertical angle is used as a lower limit and a maximum line-of-sight vertical angle corresponding to the image tile is used as an upper limit to determine a range of a line-of-sight vertical angle for cutting corresponding to the image tile, and an image region corresponding to the range of the line-of-sight vertical angle for cutting is cut from the image tile.

In an embodiment, the magnitude of the preset acute angle may be set according to the range of the line-of-sight vertical angle corresponding to the to-be-cut image tile. The more by which the maximum line-of-sight vertical angle in the range of line-of-sight vertical angle corresponding to the to-be-cut image tile is greater than the line-of-sight vertical angle representing looking straight ahead, the larger the preset acute angle is.

For example, the line-of-sight vertical angle corresponding to the image tile ranges from 45° to 90°, and the preset acute angle is ⅛ of 45°, that is, 5.625°, the remaining line-of-sight vertical angle is 90°−5.625°=84.375°, and the line-of-sight vertical angle for cutting ranges from 84.375° to 90°. In this case, an image region corresponding to 84.375° to 90° on the image tile is cut.

Figure 9:
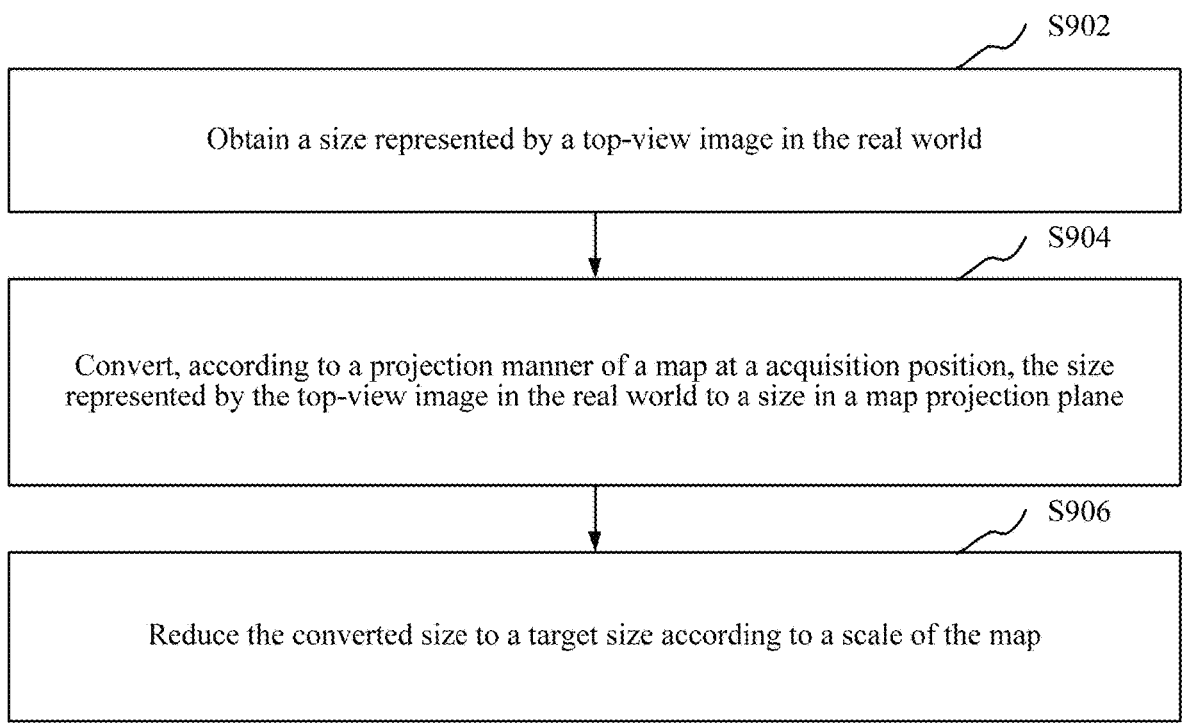
FIG. 9 is a schematic flowchart of adjusting a size of a top-view image according to an embodiment of the present disclosure.

As shown in FIG. 9, in an embodiment, after S206, a step of adjusting a size of the top-view image is further included. This specifically includes the followings.

S902: Obtaining the size represented by the top-view image in the real world.

The size represented by the top-view image in the real world is a value capable of representing the size of the top-view image in the real world.

In an embodiment, when the 3D model of the panorama image is spherical, the size represented by the top-view image in the real world may be a magnitude of a radius or a magnitude of a diameter of the top-view image in the real world. When the 3D model of the panorama image is cylindrical or cubic, the size represented by the top-view image in the real world may be a value of another parameter used for representing the size of the top-view image.

In an embodiment, S902 includes: obtaining an acquisition height of the panorama image, and obtaining a farthest projection distance of the selected image region in the top-view projection plane according to the acquisition height and a preset acute angle to be subtracted from the line-of-sight vertical angle representing looking straight ahead.

The acquisition height is a height between a acquiring device acquiring the panorama image and the ground. In an embodiment, the acquisition height is a height between a main camera acquiring the panorama image and the ground.

The farthest projection distance is a distance between a farthest projection point of the selected image region in the top-view projection plane and a position, in the top-view projection plane, of a point in the selected image region when the selected image region is top-viewed. In an embodiment, the farthest projection distance may be used for representing the size represented by the top-view image in the real world.

In an embodiment, the farthest projection distance of the selected image region in the top-view projection plane may be calculated according to the following formula: R=H*tan(90°−θ). R is the farthest projection distance of the selected image region in the top-view projection plane, and θ is the preset acute angle to be subtracted from the line-of-sight vertical angle representing looking straight ahead, and H is the acquisition height corresponding to the panorama image.

S904: Converting, according to a projection format of the map at the acquisition position, the size represented by the top-view image in the real world to the size in a map projection plane.

The map projection is a method for establishing a one-to-one correspondence between a point on a surface of the earth and a point in a map projection plane, that is, a basic method for projecting the surface of earth, a curved surface that cannot be flattened, to a plane by establishing a mathematical conversion formula between the point on the surface of the earth and the point in the map projection plane, thereby ensuring connection and integrity of spatial information in regions.

It may be understood that, after the curved surface of the earth is projected, there may be a difference between a size of a projection point of the surface of the earth in the map projection plane and a size of the point on the surface of the earth in the real world before the projection. Therefore, the electronic device may convert, according to a projection manner of the map at the acquisition position, the size represented by the top-view image in the real world to a size in a map projection plane.

Specifically, the size represented by the top-view image in the real world may be converted to the size in the map projection plane according to a scale factor.

In an embodiment, when Web Mercator (Web Mercator projection: A Web Mercator projection coordinate system is based on the entire world and in which the equator is used as a standard parallel, the prime meridian is used as the central meridian, an intersection between the standard parallel and the central meridian is used as a coordinate origin, the north and the east are positive, and the south and the west are negative) projection is used, the scale factor may be calculated according to the following formula:

$$K=R/\log(\tan(45+lat/2));$$

where K is the scale factor, R is the farthest projection distance, and lat is the latitude of the acquisition position.

S906: Reducing the converted size to a target size according to the scale of the map.

Each actually displayed size on the map is determined according to the scale, and the converted size in S504 is reduced to the target size according to the scale of the map displayed on the electronic device. A ratio of target size to the converted size is equal to the scale of the map.

In one embodiment, S210 includes: comparatively displaying the extracted road element and the top-view image of the target size on the map according to the acquisition position.

A size of an extracted road element not matching the size of the map may also be converted and scaled according to the method in S902 to S906, so that the size of the scaled extracted road element matches the size of map. Then, the scaled extracted road element and the top-view image of the target size are comparatively displayed on the map according to the acquisition position. If the obtained extracted road element is a road element matching the size of the map, the extracted road element and the top-view image of the target size are may be comparatively displayed on the map according to the acquisition position.

In one embodiment, the size represented by the top-view image in the real world is converted to the size in the map projection plane, and the converted size is reduced to the target size according to the scale of the map, and the obtained road element and the top-view image of the target size are comparatively displayed on the map, so that the top-view image of the target size matches the map. This can improve the accuracy of using the top-view image as a reference.

Figure 10:
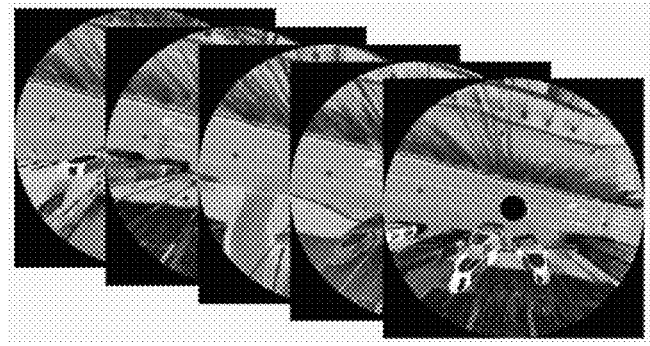
FIG. 10 is a schematic diagram of a continuous top-view image according to an embodiment of the present disclosure.

In an embodiment, there are a plurality of acquired neighboring panorama images. S210 includes: top-view projecting the selected image regions corresponding to the plurality of acquired neighboring panorama images to obtain top-view images, and the obtained top-view images are aggregated to a continuous top-view image; and comparatively displaying the continuous top-view image and the extracted road element on the map according to the corresponding acquisition position. FIG. 10 is a schematic diagram of a continuous top-view image according to an embodiment. It may be understood that, in another embodiment, another region in the continuous top-view image than a circular region may be deleted, to reduce blocking.

The aggregated continuous top-view image may present road information of a relatively long distance, so that road elements presented in the top-view image are more complete. The aggregated top-view image comparatively displayed on the map is used as a reference, so that when the extracted road element is edited, road element information can be more directly and completely presented.

In an embodiment, a plurality of corresponding top-view images may be aggregated to a continuous top-view image by slightly adjusting acquisition attitudes of a plurality of acquired neighboring panorama images. In this way, the aggregated continuous top-view image can present road elements more accurately. The acquisition attitude is an attitude of an acquisition device when the acquisition device acquires a panorama image. The attitude includes: a yaw, a pitch, and a roll.

Figure 11:
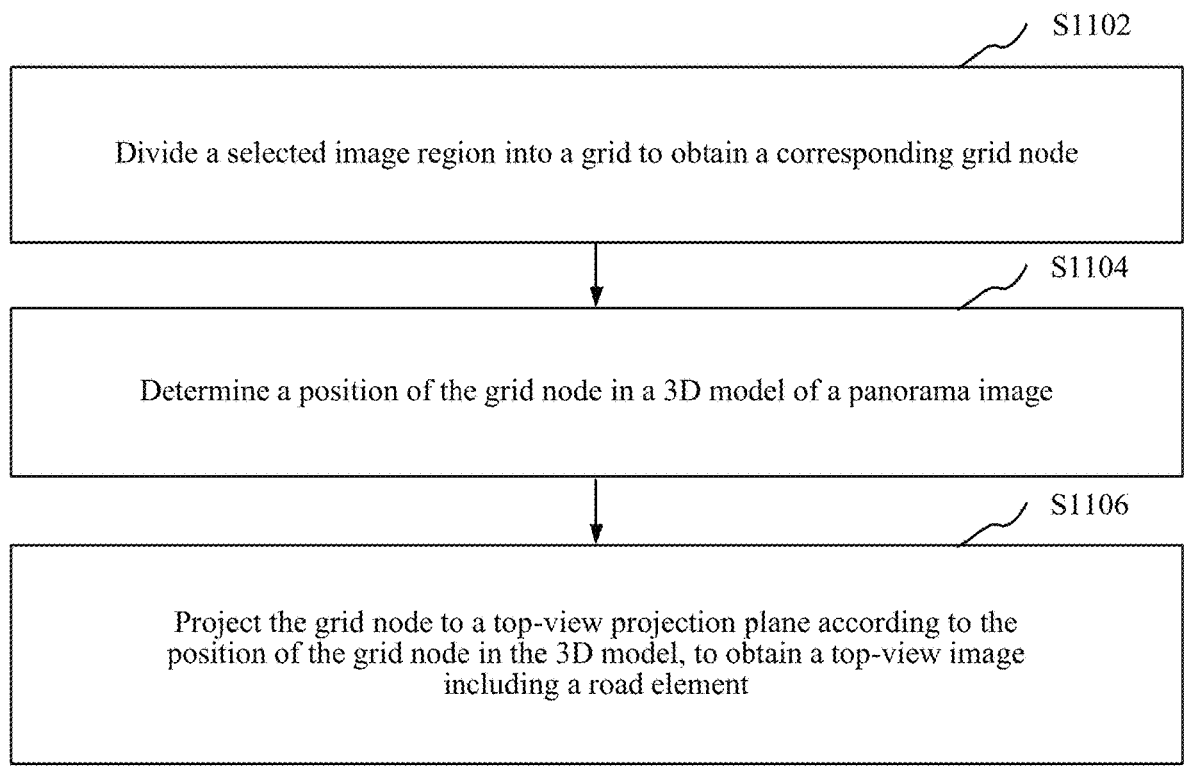
FIG. 11 is a schematic flowchart of top-view projecting a selected image region to a top-view image including a road element according to an embodiment of the present disclosure.

FIG. 11 is a schematic flowchart of S206 of top-view projecting a selected image region to a top-view image including a road element according to an embodiment. As shown in FIG. 11, S206 includes the followings.

S1102: Dividing the selected image region into a grid to obtain a corresponding grid node.

The selected image region may be divided into a grid in any manner, to obtain a corresponding grid node.

In an embodiment, the selected image region may be divided into a grid along the line-of-sight horizontal angle axis and the line-of-sight vertical angle axis in the line-of-sight angle coordinate system of the panorama image. That is, the selected image region is divided into preset pieces on both the line-of-sight vertical angle axis and the line-of-sight horizontal angle axis. The number of preset pieces on the line-of-sight horizontal angle axis may be the same as or different from a number of preset pieces on the line-of-sight vertical angle axis, and the selected image region may be evenly or unevenly divided on both axes. This is not intended to be limiting.

S1104: Determining a position of the grid node in a 3D model of the panorama image.

The 3D model of the panorama image is spherical, cylindrical or cubic.

A position of the grid node in the 3D model of the panorama image may be represented by using a coordinate in the line-of-sight angle coordinate system of the panorama image, or may be represented by using a coordinate in another coordinate system, as long as the position of the grid node in the 3D model of the panorama image can be represented. The representation manner of the position of the grid node in the 3D model of the panorama image is not limited herein.

S1106: Projecting the grid node to a top-view projection plane according to the position of the grid node in the 3D model, to obtain a top-view image including the road element.

Specifically, a position of the grid node in the top-view projection plane is determined according to the position of the grid node in the 3D model, and the top-view image including the road element is obtained according to the position of the grid node in the top-view projection plane. The position of the grid node in the 3D model of the panorama image may be represented by using a coordinate in the line-of-sight angle coordinate system of the panorama image, or may be represented by using a coordinate in another coordinate system, as long as the position of the grid node in the 3D model of the panorama image can be represented. The representation manner of the position of the grid node in the 3D model is not limited. The selected image region is divided into grid nodes for top-view projection. Compared with top-view projecting the entire image region, this improves a projection speed.

In an embodiment, the position in the 3D model of the panorama image includes a line-of-sight horizontal angle and a line-of-sight vertical angle of the grid node in the line-of-sight angle coordinate system of the panorama image.

In one embodiment, S1106 includes: calculating, according to the line-of-sight horizontal angle and the line-of-sight vertical angle of the grid node in the line-of-sight angle coordinate system of the panorama image, a projection coordinate of the grid node in the top-view projection plane, and obtaining the top-view image including the road element according to the projection coordinate in the top-view projection plane.

The projection coordinate of the grid node in the top-view projection plane may be calculated by using a projection coordinate calculating formula and according to the line-of-sight horizontal angle and the line-of-sight vertical angle of the grid node in the line-of-sight angle coordinate system of the panorama image. A specific form of the projection coordinate calculating formula is not limited herein, and any form may be used provided that the projection coordinate of the grid node in the top-view projection plane is obtained according to the line-of-sight horizontal angle and the line-of-sight vertical angle of the grid node in the line-of-sight angle coordinate system of the panorama image.

In an embodiment, the 3D model of the panorama image is spherical. That the projection coordinate of the grid node in the top-view projection plane is calculated according to the line-of-sight horizontal angle and the line-of-sight vertical angle of the grid node in the line-of-sight angle coordinate system of the panorama image includes calculating the projection coordinate of the grid node in the top-view projection plane according to following the formula:

$X = R/\tan(v-p) \times \cos(u+h);$ $Y = R/\tan(v-p) \times \sin(u+h);$ and $R = H^* \tan(90° - \theta).$ X being a horizontal projection coordinate of the grid node in the top-view projection plane, Y being a vertical projection coordinate of the grid node in the top-view projection plane, R being a farthest projection distance of the grid node in the top-view projection plane, H being an acquisition height corresponding to the panorama image, $\theta$ being a preset acute angle to be subtracted from the line-of-sight vertical angle representing looking straight ahead, v being the line-of-sight vertical angle of the grid node in the line-of-sight angle coordinate system of the panorama image, u being the line-of-sight horizontal angle of the grid node in the line-of-sight angle coordinate system of the panorama image, p being a pitch corresponding to the panorama image, and h being a yaw corresponding to the panorama image.

In an embodiment, an orthogonal projection matrix and a view matrix may be set by using a 3D rendering engine according to the farthest projection distance, and the grid node is top-view projected to the top-view projection plane according to the orthogonal projection matrix and the view matrix, to obtain a corresponding top-view image.

In an embodiment, when Open Graphics Library (OpenGL) is used, the orthogonal projection matrix may be set to ortho(−R, R, −R, R), and the view matrix may be set to lookat(0, 0, R, 0, 0, 0, 0, 1, 0).

The orthogonal projection matrix ortho(−R, R, −R, R) represents left: −R, right: R, bottom: −R, and top: R.

In the view matrix lookat(0, 0, R, 0, 0, 0, 0, 1, 0), the first group (0, 0, R) respectively correspond to parameters eyex, eyey, and eyez, representing that a position of a camera in a world coordinate system is (0, 0, R); the second group (0, 0, 0) respectively correspond to parameters centerx, centery, and centerz, representing that an eye position of an object at which the camera is targeted in the world coordinate system is (0, 0, 0); the third group (0, 1, 0) respectively correspond to parameters upx, upy, and upz, representing a direction of an upward direction of the camera in the world coordinate system, that is, the top of the camera faces upward. It may be understood that, the camera herein is an abstract execution entity for observing from the observation point, rather than a panorama image acquisition device.

Further, a rectangular image region covering all road elements may be captured from the top-view projection plane according to the orthogonal projection matrix ortho(−R, R, −R, R) and used as the top-view image.

It may be understood that, in the foregoing formula, the pitch and the yaw corresponding to the panorama image are used for correcting the line-of-sight horizontal angle and the line-of-sight vertical angle of the selected image region including the road element. In this way, the calculated coordinate of the grid node in the top-view projection plane is more accurate.

In an embodiment, the line-of-sight horizontal angle and the line-of-sight vertical angle of the selected image region including the road element may further be corrected according to a roll corresponding to the panorama image, and then the coordinate of the grid node in the top-view projection plane is calculated according to the formula and by using the corrected line-of-sight horizontal angle and line-of-sight vertical angle.

Figure 12:
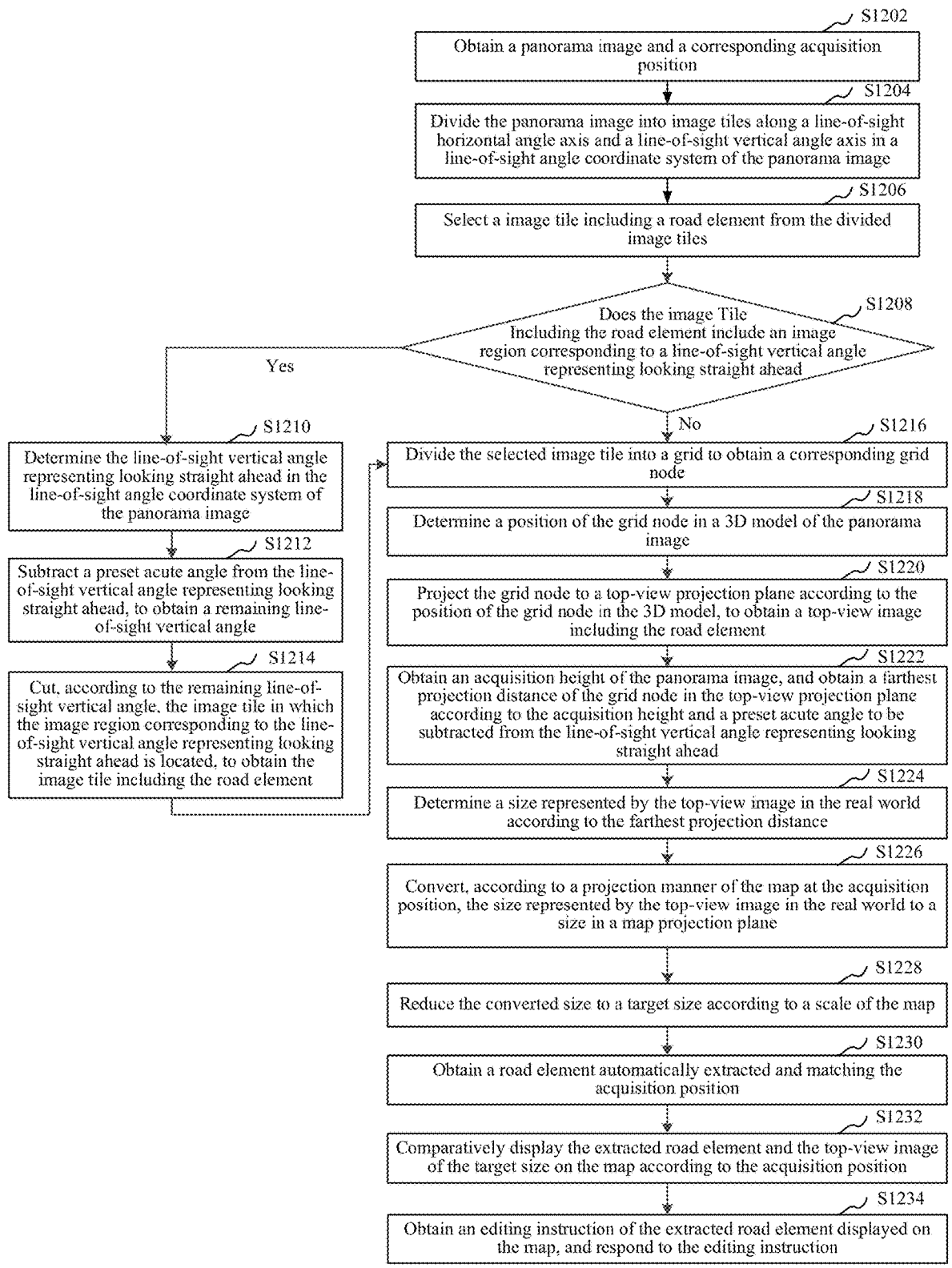
FIG. 12 is a schematic flowchart of a method for editing a road element on a map according to another embodiment of the present disclosure.

In an embodiment, as shown in FIG. 12, another method for editing a road element on a map is provided. The method includes the followings.

S1202: Obtaining a panorama image and a corresponding acquisition position.

S1204: Dividing the panorama image into image tiles along a line-of-sight horizontal angle axis and a line-of-sight vertical angle axis in a line-of-sight angle coordinate system of the panorama image.

S1206: Selecting an image tile including a road element from the divided image tiles.

S1208: Determining whether the image tile including the road element includes an image region corresponding to a line-of-sight vertical angle representing looking straight ahead; and if the image tile including the road element includes an image region corresponding to a line-of-sight vertical angle representing looking straight ahead, performing S1210; otherwise, performing S1216.

S1210: Determining the line-of-sight vertical angle representing looking straight ahead in the line-of-sight angle coordinate system of the panorama image.

S1212: Subtracting a preset acute angle from the line-of-sight vertical angle representing looking straight ahead, to obtain a remaining line-of-sight vertical angle.

S1214: Cutting, according to the remaining line-of-sight vertical angle, the image tile in which the image region corresponding to the line-of-sight vertical angle representing looking straight ahead is located, to obtain the image tile including the road element.

Specifically, a cut image tile and an image tile that is not cut and that includes the road element are together selected as image tiles including the road element.

S1216: Dividing the selected image tile into a grid to obtain a corresponding grid node.

S1218: Determining a position of the grid node in a 3D model of the panorama image.

S1220: Projecting the grid node to a top-view projection plane according to the position of the grid node in the 3D model, to obtain a top-view image containing the road element.

In an embodiment, a projection coordinate of the grid node in the top-view projection plane may be calculated according to following the formulas:

$$X=R/\tan(v-p)\times\cos(u+h);$$

$$Y=R/\tan(v-p)\times\sin(u+h); \text{ and}$$

$$R=H*\tan(90°-\theta);$$

X being a horizontal projection coordinate of the grid node in the top-view projection plane, Y being a vertical projection coordinate of the grid node in the top-view projection plane, R being a farthest projection distance of the grid node in the top-view projection plane, H being an acquisition height corresponding to the panorama image, θ being a preset acute angle to be subtracted from the line-of-sight vertical angle representing looking straight ahead, v being the line-of-sight vertical angle of the grid node in the line-of-sight angle coordinate system of the panorama image, u being the line-of-sight horizontal angle of the grid node in the line-of-sight angle coordinate system of the panorama image, p being a pitch corresponding to the panorama image, and h being a yaw corresponding to the panorama image.

Further, the top-view image including the road element is obtained according to the projection coordinate in the top-view projection plane.

S1222: Obtaining an acquisition height of the panorama image, and obtaining a farthest projection distance of the grid node in the top-view projection plane according to the acquisition height and a preset acute angle to be subtracted from the line-of-sight vertical angle representing looking straight ahead.

In an embodiment, the farthest projection distance of the grid node in the top-view projection plane may be calculated according to the following formula: $R=H*\tan(90°-\theta)$. R is the farthest projection distance of the grid node in the top-view projection plane, and θ is the preset acute angle to be subtracted from the line-of-sight vertical angle representing looking straight ahead.

S1224: Determining the size represented by the top-view image in the real world according to the farthest projection distance.

S1226: Converting, according to a projection format of the map at the acquisition position, the size represented by the top-view image in the real world to a size in a map projection plane.

The size represented by the top-view image in the real world may be converted to the size in the map projection plane according to a scale factor.

In an embodiment, the scale factor may be calculated according to the following the formula:

$$K=R/\log(\tan(45+\text{lat}/2));$$

K being the scale factor, R being the farthest projection distance, and lat being a latitude of the acquisition position.

S1228: Reducing the converted size to a target size according to the scale of the map.

S1230: Obtaining a road element automatically extracted and matching the acquisition position.

S1232: Comparatively displaying the extracted road element and the top-view image of the target size on the map according to the acquisition position.

In an embodiment, there are a plurality of acquired neighboring panorama images. Selected image regions corresponding to the plurality of acquired neighboring panorama images are top-view projected to obtain top-view images, and the obtained top-view images are aggregated to a continuous top-view image; and the continuous top-view image and the extracted road element are comparatively displayed on the map according to the corresponding acquisition position. When the extracted road element is edited with reference to the aggregated top-view image comparatively displayed on the map, road element information can be more directly and completely presented.

S1234: Obtaining an editing instruction of the extracted road element displayed on the map, and respond to the editing instruction.

In the method for editing a road element on a map, a planar top-view image including an accurate road element is obtained by top-view projecting the panorama image, and the planar top-view image is used as a reference to edit the extracted road element. Compared with manually editing a road element with reference to a laser point cloud street view in a 3D space, this significantly improves the efficiency of editing a road element.

Moreover, the panorama image is divided into image tiles, and an image tile containing the road element is selected and top-view projected, to obtain a top-view image. Because the image tile is relatively small, projection processing is relatively fast, avoiding slow processing caused by projection of an excessively large image region. In this way, the speed of top-view projection is increased, and further, the speed of generating a top-view image is increased.

Then, the size represented by the top-view image in the real world is converted to the size in the map projection plane, and the converted size is reduced to the target size according to the scale of the map, and the obtained road element and the top-view image of the target size are comparatively displayed on the map, so that the top-view image of the target size matches the map. This can improve the accuracy of using the top-view image as a reference.

In addition, the selected image region is divided into grid nodes for top-view projection. Compared with top-view projecting the entire image region, this improves a projection speed.

In an embodiment, an electronic device is further provided. An internal structure of the electronic device may be shown in FIG. 1. The electronic device includes an apparatus for editing a road element on a map. The apparatus for editing a road element on a map includes modules, and each module may be all or partially implemented by software, hardware, or a combination thereof.

Figure 13:
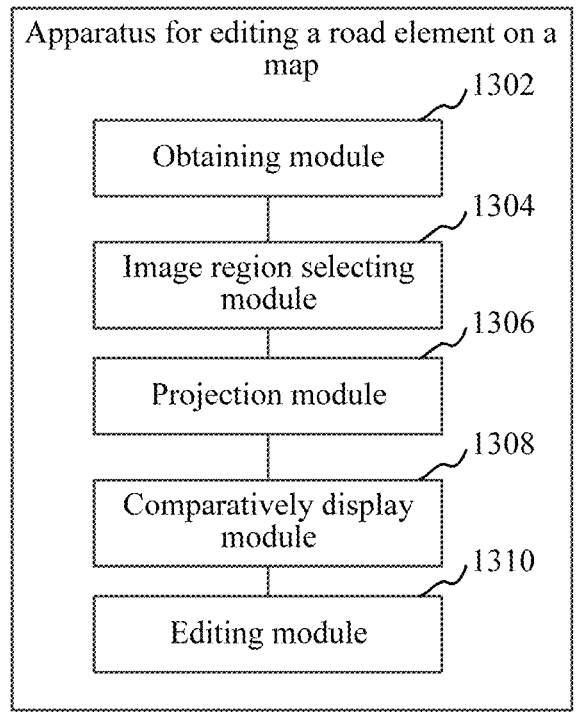
FIG. 13 is a block diagram of an apparatus for editing a road element on a map according to an embodiment of the present disclosure.

In an embodiment, as shown in FIG. 13, an apparatus for editing a road element on a map is provided. The apparatus includes: an obtaining module 1302, an image region selecting module 1304, a projection module 1306, a comparatively display module 1308, and an editing module 1310.

The obtaining module 1302 is configured to obtain a panorama image and a corresponding acquisition position.

The image region selecting module 1304 is configured to select an image region including a road element from the panorama image.

The projection module 1306 is configured to top-view project the selected image region to a top-view image including the road element.

The obtaining module 1302 is further configured to obtain a road element automatically extracted and matching the acquisition position.

The comparatively display module 1308 is configured to comparatively display the extracted road element and the top-view image on a map according to the acquisition position.

The editing module 1310 is configured to: obtain an editing instruction of the extracted road element displayed on the map, and respond to the editing instruction.

In an embodiment, the image region selecting module 1304 is further configured to: divide the panorama image into image tiles along a line-of-sight horizontal angle axis and a line-of-sight vertical angle axis in a line-of-sight angle coordinate system of the panorama image; and select an image tile including the road element from the divided image tiles.

In one embodiment, the projection module 1306 is further configured to top-view project the selected image tiles to a top-view projection plane, to form the top-view image.

In an embodiment, the image region selecting module 1304 is further configured to: determine a line-of-sight vertical angle representing looking straight ahead in a line-of-sight angle coordinate system of the panorama image; subtract a preset acute angle from the line-of-sight vertical angle representing looking straight ahead, to obtain a remaining line-of-sight vertical angle; and select the image region including the road element from the panorama image according to the remaining line-of-sight vertical angle.

In an embodiment, the obtaining module 1302 is further configured to obtain a size represented by the top-view image in the real world.

Figure 14:
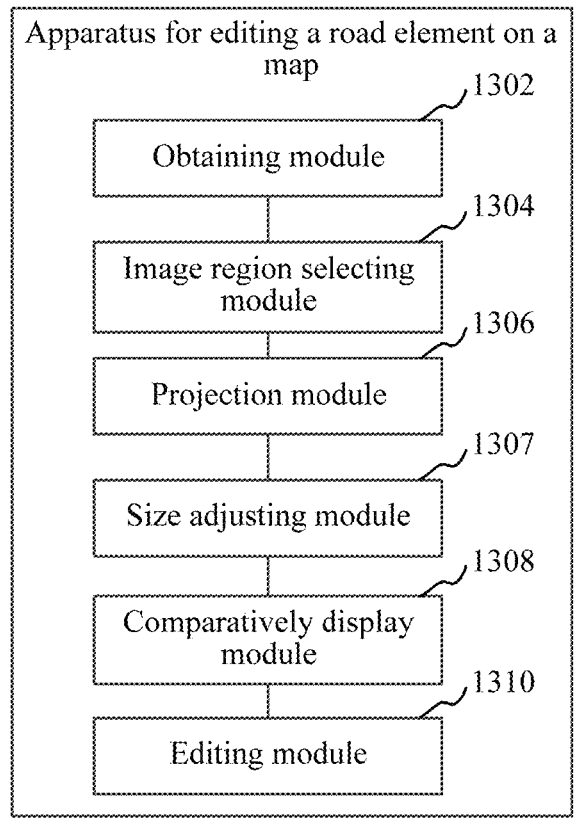
FIG. 14 is a block diagram of an apparatus for editing a road element on a map according to another embodiment.

In one embodiment, as shown in FIG. 14, the apparatus further includes: a size adjusting module 1307, configured to: convert, according to a projection manner of the map at the acquisition position, the size represented by the top-view image in the real world to a size in a map projection plane, and reduce the converted size to a target size according to a scale of the map.

The comparatively display module 1308 is configured to comparatively display the extracted road element and the top-view image of the target size on the map according to the acquisition position.

In an embodiment, there are a plurality of acquired neighboring panorama images. The comparatively display module 1308 is further configured to: top-view project selected image regions corresponding to the plurality of acquired neighboring panorama images to obtain top-view images, and aggregate the obtained top-view images to a continuous top-view image; and comparatively display the continuous top-view image and the extracted road element on the map according to the corresponding acquisition position.

In an embodiment, the projection module 1306 is further configured to: divide the selected image region into a grid to obtain a corresponding grid node; determine a position of the grid node in a 3D model of the panorama image; and project the grid node to a top-view projection plane according to the position of the grid node in the 3D model, to obtain the top-view image including the road element.

In an embodiment, the 3D model of the panorama image is spherical, and the position in the 3D model of the panorama image includes a line-of-sight horizontal angle and a line-of-sight vertical angle of the grid node in a line-of-sight angle coordinate system of the panorama image.

In one embodiment, the projection module 1306 is further configured to calculate a projection coordinate of the grid node in the top-view projection plane according to following the formulas:

$$X = R/\tan(v-p) \times \cos(u+h);$$

$$Y = R/\tan(v-p) \times \sin(u+h); \text{ and}$$

$$R = H^* \tan(90° - \theta);$$

X being a horizontal projection coordinate of the grid node in the top-view projection plane, Y being a vertical projection coordinate of the grid node in the top-view projection plane, R being a farthest projection distance of the grid node in the top-view projection plane, H being an acquisition height corresponding to the panorama image, $\theta$ being a preset acute angle to be subtracted from the line-of-sight vertical angle representing looking straight ahead, v being the line-of-sight vertical angle of the grid node in the line-of-sight angle coordinate system of the panorama image, u being the line-of-sight horizontal angle of the grid node in the line-of-sight angle coordinate system of the panorama image, p being a pitch corresponding to the panorama image, and h being a yaw corresponding to the panorama image.

The projection module 1306 is further configured to obtain the top-view image including the road element according to the projection coordinate in the top-view projection plane.

It should be understood that although the steps in the embodiments of the present disclosure are not necessarily performed in an order indicated by the step numbers. Unless otherwise clearly described in this specification, an order of performing the steps is not strictly limited, and the steps may be performed in another order. In addition, at least some steps in the embodiments may include a plurality of sub-steps or a plurality of stages. The sub-steps or stages are not necessarily performed at the same moment, and instead may be performed at different moments. The sub-steps or stages are not necessarily sequentially performed, and instead the sub-steps or stages and at least some of other steps or sub-steps or stages of other steps may be performed by turns or alternately.

A person of ordinary skill in the art may understand that all or some of the processes of the methods in the foregoing embodiments may be implemented by a computer program instructing relevant hardware. The program may be stored in a non-volatile computer readable storage medium. When the program is run, the processes of the foregoing methods in the embodiments are performed. Any reference to a memory, memory, database or another medium used in the various embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random-access memory (RAM) or an external high-speed cache. By way of illustration and not limitation, the RAM is available in a variety of forms, such as a static RAM (SRAM), a dynamic RAM (DRAM), a synchronous DRAM (SDRAM), a dual data rate SDRAM (DDRS-DRAM), an enhanced SDRAM (ESDRAM), a synchronization link (Synchlink) DRAM (SLDRAM), a memory bus (Rambus) direct RAM (RDRAM), a direct memory bus dynamic RAM (DRDRAM), and a memory bus dynamic RAM (RDRAM).

The technical features of the foregoing embodiments may be randomly combined. For the purpose of concise descriptions, not all possible combinations of the technical features in the foregoing embodiments are described, but as long as combinations of the technical features do not conflict each other, the combinations of the technical features should be considered as falling within the scope of this specification.

The foregoing embodiments show only several implementations of the present disclosure, and descriptions thereof are in detail, but shall not be understood as limiting the patent scope of the present disclosure. It should be noted that several changes and improvements may further be made by a person of ordinary skill in the art without departing from the idea of the present disclosure, and these changes and improvements all fall within the protection scope of the present disclosure. Therefore, the protection scope of the present disclosure shall be subject to the appended claims.

What is claimed is:

1. A map-editing method for an electronic device, comprising:
   forming a panorama image from a plurality of images captured at an acquisition position;
   selecting an image region containing a road element from the panorama image;
   projecting the selected image region to a top-view image containing the road element, including:
      dividing the selected image region into a grid to obtain a grid node;
      determining a position of the grid node in a three-dimensional (3D) model of the panorama image, wherein the 3D model of the panorama image is spherical; and
      projecting the grid node to a top-view projection plane according to the position of the grid node in the 3D model, to obtain the top-view image containing the road element;
   obtaining an extracted road element matching the acquisition position;
   comparatively displaying the extracted road element and the top-view image on a map according to the acquisition position; and
   obtaining an editing instruction of the extracted road element displayed on the map, and responding to the editing instruction.

2. The method according to claim 1,
   wherein the selecting an image region containing a road element from the panorama image comprises: dividing the panorama image into image tiles along a line-of-sight horizontal angle axis and a line-of-sight vertical angle axis in a line-of-sight angle coordinate system of the panorama image; and selecting an image tile comprising the road element from the divided image tiles; and
   wherein the projecting the selected image region to a top-view image containing the road element comprises: projecting the selected image tiles to the top-view projection plane to form the top-view image.

3. The method according to claim 1, wherein the selecting an image region containing a road element from the panorama image comprises:
   determining a line-of-sight vertical angle representing looking straight ahead in a line-of-sight angle coordinate system of the panorama image;
   subtracting a preset acute angle from the line-of-sight vertical angle representing looking straight ahead, to obtain a remaining line-of-sight vertical angle; and
   selecting the image region containing the road element from the panorama image according to the remaining line-of-sight vertical angle.

4. The method according to claim 1, further comprising:
   obtaining a size represented by the top-view image in a real world;
   converting, according to a projection manner of the map at the acquisition position, the size represented by the top-view image in the real world to a size in a map projection plane; and
   reducing the converted size to a target size according to a scale of the map; and wherein the comparatively displaying the extracted road element and the top-view image on a map according to the acquisition position comprises: comparatively displaying the extracted road element and the top-view image of the target size on the map according to the acquisition position.

5. The method according to claim 1, wherein there are a plurality of acquired neighboring panorama images, and the comparatively displaying the extracted road element and the top-view image on a map according to the acquisition position comprises:
   projecting selected image regions corresponding to the plurality of acquired neighboring panorama images to obtain top-view images, and aggregating the obtained top-view images to a continuous top-view image; and
comparatively displaying the continuous top-view image and the extracted road element on the map according to the corresponding acquisition position.

6. The method according to claim 1, wherein the position in the 3D model of the panorama image comprises a line-of-sight horizontal angle and a line-of-sight vertical angle of the grid node in a line-of-sight angle coordinate system of the panorama image; and the projecting the grid node to a top-view projection plane according to the position of the grid node in the 3D model, to obtain the top-view image comprising the road element comprises:

calculating a projection coordinate of the grid node in the top-view projection plane according to following the formulas:

$$X=R/\tan(v-p)\times\cos(u+h);$$

$$Y=R/\tan(v-p)\times\sin(u+h);\text{ and}$$

$$R=H*\tan(90°-\theta);$$

X being a horizontal projection coordinate of the grid node in the top-view projection plane, Y being a vertical projection coordinate of the grid node in the top-view projection plane, R being a farthest projection distance of the grid node in the top-view projection plane, H being an acquisition height corresponding to the panorama image, θ being a preset acute angle to be subtracted from the line-of-sight vertical angle representing looking straight ahead, v being the line-of-sight vertical angle of the grid node in the line-of-sight angle coordinate system of the panorama image, u being the line-of-sight horizontal angle of the grid node in the line-of-sight angle coordinate system of the panorama image, p being a pitch corresponding to the panorama image, and h being a yaw corresponding to the panorama image; and obtaining the top-view image comprising the road element according to the projection coordinate in the top-view projection plane.

7. An electronic device for map-editing, comprising: a memory storing computer program instructions; and a processor coupled to the memory and, upon executing the computer program instructions, configured to perform:

forming a panorama image from a plurality of images captured at an acquisition position;
selecting an image region containing a road element from the panorama image;
projecting the selected image region to a top-view image containing the road element;
projecting the selected image region to a top-view image containing the road element including:
  dividing the selected image region into a grid to obtain a grid node;
  determining a position of the grid node in a three-dimensional (3D) model of the panorama image, wherein the 3D model of the panorama image is spherical; and
  projecting the grid node to a top-view projection plane according to the position of the grid node in the 3D model, to obtain the top-view image containing the road element;
obtaining an extracted road element matching the acquisition position;
comparatively displaying the extracted road element and the top-view image on a map according to the acquisition position; and
obtaining an editing instruction of the extracted road element displayed on the map, and responding to the editing instruction.

8. The electronic device according to claim 7,
wherein the selecting an image region containing a road element from the panorama image comprises: dividing the panorama image into image tiles along a line-of-sight horizontal angle axis and a line-of-sight vertical angle axis in a line-of-sight angle coordinate system of the panorama image; and selecting an image tile comprising the road element from the divided image tiles; and wherein the projecting the selected image region to the top-view image containing the road element comprises: projecting the selected image tiles to a top-view projection plane to form the top-view image.

9. The electronic device according to claim 7, wherein the selecting an image region containing a road element from the panorama image comprises:

determining a line-of-sight vertical angle representing looking straight ahead in a line-of-sight angle coordinate system of the panorama image;
subtracting a preset acute angle from the line-of-sight vertical angle representing looking straight ahead, to obtain a remaining line-of-sight vertical angle; and
selecting the image region containing the road element from the panorama image according to the remaining line-of-sight vertical angle.

10. The electronic device according to claim 7, wherein the processor is further configured to perform:

obtaining a size represented by the top-view image in a real world;
converting, according to a projection manner of the map at the acquisition position, the size represented by the top-view image in the real world to a size in a map projection plane; and
reducing the converted size to a target size according to a scale of the map; and the wherein comparatively displaying the extracted road element and the top-view image on a map according to the acquisition position comprises: comparatively displaying the extracted road element and the top-view image of the target size on the map according to the acquisition position.

11. The electronic device according to claim 7, wherein there are a plurality of acquired neighboring panorama images, and the comparatively displaying the extracted road element and the top-view image on a map according to the acquisition position comprises:

projecting selected image regions corresponding to the plurality of acquired neighboring panorama images to obtain top-view images, and aggregating the obtained top-view images to a continuous top-view image; and
comparatively displaying the continuous top-view image and the extracted road element on the map according to the corresponding acquisition position.

12. The electronic device according to claim 7, wherein the position in the 3D model of the panorama image comprises a line-of-sight horizontal angle and a line-of-sight vertical angle of the grid node in a line-of-sight angle coordinate system of the panorama image; and the projecting the grid node to a top-view projection plane according to the position of the grid node in the 3D model, to obtain the top-view image comprising the road element comprises:

calculating a projection coordinate of the grid node in the top-view projection plane according to following the formulas:

$X=R/\tan(v-p)\times\cos(u+h);$ $Y=R/\tan(v-p)\times\sin(u+h);$ and $R=H*\tan(90°-\theta);$ X being a horizontal projection coordinate of the grid node in the top-view projection plane, Y being a vertical projection coordinate of the grid node in the top-view projection plane, R being a farthest projection distance of the grid node in the top-view projection plane, H being an acquisition height corresponding to the panorama image, θ being a preset acute angle to be subtracted from the line-of-sight vertical angle representing looking straight ahead, v being the line-of-sight vertical angle of the grid node in the line-of-sight angle coordinate system of the panorama image, u being the line-of-sight horizontal angle of the grid node in the line-of-sight angle coordinate system of the panorama image, p being a pitch corresponding to the panorama image, and h being a yaw corresponding to the panorama image; and obtaining the top-view image comprising the road element according to the projection coordinate in the top-view projection plane.

13. A non-transitory computer-readable storage medium storing computer program instructions executable by at least one processor to perform:
forming a panorama image from a plurality of images captured at an acquisition position;
selecting an image region containing a road element from the panorama image;
projecting the selected image region to a top-view image containing the road element including:
dividing the selected image region into a grid to obtain a grid node;
determining a position of the grid node in a three-dimensional (3D) model of the panorama image, wherein the 3D model of the panorama image is spherical; and
projecting the grid node to a top-view projection plane according to the position of the grid node in the 3D model, to obtain the top-view image containing the road element;
obtaining an extracted road element matching the acquisition position;
comparatively displaying the extracted road element and the top-view image on a map according to the acquisition position; and
obtaining an editing instruction of the extracted road element displayed on the map, and responding to the editing instruction.

14. The non-transitory computer-readable storage medium according to claim 13,
wherein the selecting an image region containing a road element from the panorama image comprises: dividing the panorama image into image tiles along a line-of-sight horizontal angle axis and a line-of-sight vertical angle axis in a line-of-sight angle coordinate system of the panorama image; and
wherein selecting an image tile comprising the road element from the divided image tiles; and the projecting the selected image region to a top-view image containing the road element comprises: projecting the selected image tiles to the top-view projection plane to form the top-view image.

15. The non-transitory computer-readable storage medium according to claim 13, wherein the selecting an image region containing a road element from the panorama image comprises:
determining a line-of-sight vertical angle representing looking straight ahead in a line-of-sight angle coordinate system of the panorama image;
subtracting a preset acute angle from the line-of-sight vertical angle representing looking straight ahead, to obtain a remaining line-of-sight vertical angle; and
selecting the image region containing the road element from the panorama image according to the remaining line-of-sight vertical angle.

16. The non-transitory computer-readable storage medium according to claim 13, further including program instructions executable by the processor to perform:
obtaining a size represented by the top-view image in a real world;
converting, according to a projection manner of the map at the acquisition position, the size represented by the top-view image in the real world to a size in a map projection plane; and
reducing the converted size to a target size according to a scale of the map; and the wherein comparatively displaying the extracted road element and the top-view image on a map according to the acquisition position comprises: comparatively displaying the extracted road element and the top-view image of the target size on the map according to the acquisition position.

17. The non-transitory computer-readable storage medium according to claim 13, wherein there are a plurality of acquired neighboring panorama images, and the comparatively displaying the extracted road element and the top-view image on a map according to the acquisition position comprises:
projecting selected image regions corresponding to the plurality of acquired neighboring panorama images to obtain top-view images, and aggregating the obtained top-view images to a continuous top-view image; and
comparatively displaying the continuous top-view image and the extracted road element on the map according to the corresponding acquisition position.

18. The method according to claim 1, wherein the extracted road element is a road element present in a road at the acquisition position, and wherein the obtaining the extracted road element further comprises:
obtaining the extracted road element from a laser point cloud.

19. The electronic device according to claim 7, wherein the extracted road element is a road element present in a road at the acquisition position, and wherein the obtaining the extracted road element further comprises:
obtaining the extracted road element from a laser point cloud.

20. The non-transitory computer-readable storage medium according to claim 13, wherein the extracted road element is a road element present in a road at the acquisition position, and wherein the obtaining the extracted road element further comprises:
obtaining the extracted road element from a laser point cloud.

* * * * *